United States Patent
Itoh et al.

(10) Patent No.: US 7,656,773 B2
(45) Date of Patent: Feb. 2, 2010

(54) OBJECTIVE LENS UNIT AND OPTICAL PICKUP DEVICE

(75) Inventors: Teruhiko Itoh, Hachioji (JP); Akira Sawagami, Sagamihara (JP)

(73) Assignee: Konica Minolta OPTO, Inc., Tokyo (JP)

(\*) Notice: Subject to any disclaimer, the term of this patent is extended or adjusted under 35 U.S.C. 154(b) by 746 days.

(21) Appl. No.: 11/353,999

(22) Filed: Feb. 15, 2006

(65) Prior Publication Data

US 2006/0187797 A1    Aug. 24, 2006

(30) Foreign Application Priority Data

Feb. 18, 2005    (JP) ............................. 2005-042279
Feb. 25, 2005    (JP) ............................. 2005-050826

(51) Int. Cl.
*G11B 7/00*    (2006.01)
(52) U.S. Cl. ................................. 369/112.23
(58) Field of Classification Search ............ 369/112.01, 369/112.02, 112.1, 112.23, 44.23; 359/642
See application file for complete search history.

(56) References Cited

U.S. PATENT DOCUMENTS 7,236,445 B2 *   6/2007   Hattori et al. .......... 369/112.23
7,515,523 B2 *   4/2009   Kimura et al. ......... 369/112.07

\* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

An objective lens unit for an optical pickup device which is composed of a first optical element including a first element body positioned on an optical information recording medium side and a first annular portion formed on the outer periphery of the first element body, and further composed of a second optical element including a second element body and a second annular light source side of the first element body and a second annular portion formed on the outer periphery of the second element body and coupled to the first annular portion, and at least one of the first and second annular portion has a portion in which the size of outer shape is smaller than the vicinity on at least a part of the light source side.

20 Claims, 9 Drawing Sheets

OBJECTIVE LENS UNIT AND OPTICAL PICKUP DEVICE

This application is based on Japanese Patent Application No. 2005-042279, filed on Feb. 18, 2005 and No. 2005-050826 filed on Feb. 25, 2005 in Japanese Patent Office, the entire content of which is hereby incorporated by reference.

BACKGROUND OF THE INVENTION

The present invention relates to an objective lens unit that is suitable as an optical pickup objective system, and further relates to the optical pickup device including this objective lens unit.

Until now, various kinds of optical pickup devices for reproducing and recording information on optical information recording media such as a CD (compact disc) or a DVD (digital video disc) and the like have been developed and manufactured and are being widely used. It is to be noted that "reproducing and recording" refers to reproduction and/or recording. Examples of the optical head device which is built into the optical pickup device include those in which the objective lens body and the phase control element are secured as a single unit inside a holder for stable recording and playing of both CDs and DVDs (Refer to Patent Document 1).

However, in the optical head device described above, because the structure is such that the two optical elements which are the objective lens and the phase control element are indirectly connected via the holder, alignment of both optical elements is not simple. In addition, there is a problem in that the degree of freedom for the configuration of the holder is limited by the size and distance between both optical elements because both optical elements are fixed in the holder.

Due to this problem, a method can be considered in which the two optical elements, which are the objective lens and the like, are provided with cylindrical flanges on their outer peripheries and both optical elements are directly joined together by the flange to form an optical lens unit which is a single part. In this case, the alignment accuracy of both optical elements can be ensured and assembly in holders with various shapes is simple.

However, for the above-described objective lens unit, there is a tendency for the girth of the objective lens unit to become large as a result of providing a flange of a thickness exceeding a predetermined amount on both optical elements which are the objective lens and the like, or because of securing space for adhering both optical elements to each other.

In the optical pickup device including the above-described objective lens unit, securing the objective lens unit to the front end side of the cylindrical holder may be considered in order to lighten the movable portion of the objective system including the objective lens unit. However in this case, the diameter of the holder is increased to correspond with the increased diameter of the objective lens unit and the weight of the movable portion of the objective system is increased and there is a tendency for the responsiveness of the movable portion to deteriorate. On the other hand, if the diameter of optical elements such as the objective lens and the phase control element, and thus that of the objective lens unit, is not larger than a certain amount, the information cannot be reproduced and recorded using NA conforming to the standard. In particular, in recent times, there has been a strong desire for objective lenses which meet the high NA standards and the diameter of the optical elements such as the objective lenses and phase control elements and the like must be above a certain value.

[Patent Document 1] Unexamined Japanese Patent Application Publication No. 2001-6203

SUMMARY OF THE INVENTION

An object of this invention is to provide an objective lens unit in which the NA is ensured and the movable portion of the objective system is lightened.

Another object of this invention is to provide an optical pickup device which includes the above-described objective lens unit.

In order to achieve the objects above, one embodiment of this invention is: an objective lens unit for an optical pickup device comprising:

a first optical element having a first element body which is to be disposed at the optical information recording medium side and a first annular portion that is formed on the outer periphery of the first element body; and a second optical element having a second element body which is to be disposed at the light source side of the first element body and a second annular portion which is formed on the outer periphery of the second element body and is joined with the first annular portion, and in at least one portion at the light source side of the outer periphery of at least one of the first annular portion and the second annular portion has a portion whose exterior size is smaller than the vicinity, as well as an optical pickup device comprising:

an objective lens unit described in the above for forming a spot on the recording surface of the optical information recording medium; and a holder which has a cylindrical configuration and one end has a fixing portion for fixing the objective lens unit by fitting the objective lens unit in from the second optical element side, and the optical pickup device reads the information on the optical information recording medium or alternatively, writes information on the optical information recording medium.

DETAILED DESCRIPTION OF THE PREFERRED EMBODIMENTS

Figure 1:
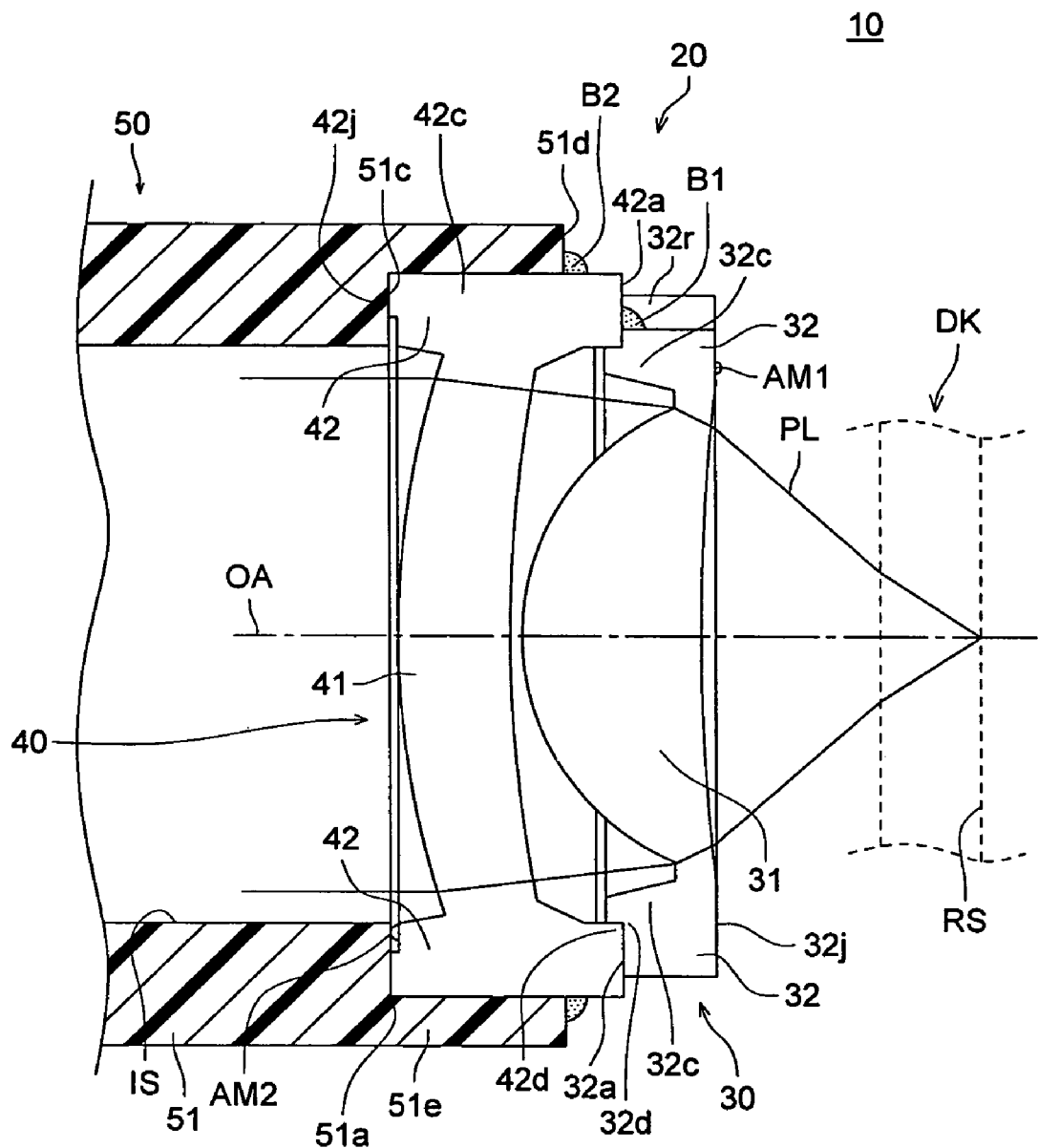
FIG. 1 shows a lateral cross-section of the objective lens unit and the like of the first embodiment.

In order to solve the problems described above, the objective lens unit for an optical pickup device of this invention has: (a) a first optical element having a first element body which is to be disposed at the optical information recording medium side and a first annular portion that is formed on the outer periphery of the first element body, and in which concave portions extend in the axial direction at multiple locations on the outer periphery side surface of the first annular portion; and (b) a second optical element having a second element body which is to be disposed at the light source side of the first element body and a second annular portion which is formed on the outer periphery of the second element body, and is joined with the first annular portion.

In the above-described objective lens unit, because concave portions extend in the axial direction are formed at multiple locations on the outer periphery surface of the first annular portion formed on the first optical element, the locations corresponding to the concave portions on the optical information recording medium side portion of the second annular portion are used, and the objective lens unit can be fixed in the holder. As a result, the outer periphery size of the second annular portion and hence the second element body also can be made smaller, and thus the size of the portion of the holder that supports the objective lens unit can be made smaller. In particular, in the case for example, where the objective lens unit is fixed to the front end of the small cylindrical holder which is the type in which the actuator coil is mounted on the periphery, the size of the holder itself can be made smaller, and thus the movable portion which includes the objective lens unit and the holder can be made lighter, and functions such as responsiveness of the optical pickup device can be improved.

In a specific aspect of this invention, in the above objective lens unit, the concave portion is a reduced radius portion at the substantially cylindrical outer periphery surface of the first annular portion. In this case, a comparatively smooth concave portion can be formed without difficulty by adjusting the radius of the outer peripheral side surface of the first annular portion.

In addition, in another specific aspect of the invention, the concave portion is the thin portion of the first annular portion. In this case, there is no need to reduce the inner diameter of the first annular portion, and the strength of the first annular portion is maintained at the portion excluding the concave portion.

In yet another specific aspect of this invention, on the outer periphery surface of the first annular portion, the radius to the bottom of the convex portion is smaller by a prescribed amount than the radius of the portion corresponding to the concave portion of the substantially cylindrical outer periphery surface of the second annular portion. In this case, the first and second optical elements can be held with bonding agent by adjusting the prescribed amount which represents the difference in the radius, and efficacy of the bonding the first and second optical elements can be improved. In addition, the outer periphery surface of the second projection protrudes further outward than the concave portion of the first projection, and thus bonding becomes possible while the second optical element which has a tendency to have a large diameter is positioned at the lower side and the efficiency of the bonding operation is improved.

In addition, in yet another specific aspect of the invention, the concave portions are formed at regular intervals along the outer periphery of the first annular portion. In this case, the first optical element can be uniformly bonded to the second optical element.

In another specific aspect of the invention, the first annular portion is a cylinder having a first projection which projects further to the light source side than the outer periphery of the first element body, and the second annular portion is a cylinder having a second projection which projects further to the optical information recording medium side than the outer periphery of the second element body. In this case, the first and second projections are used to join the first and second optical elements.

In another specific aspect of the invention, the inner diameter of the light source side end of the first projection is larger than the inner diameter of the base portion which is the optical information recording medium side end of the first projection, and the inner diameter of the optical information recording medium side end of the second projection is larger than the inner diameter of the base portion which is the light source side end of the second projection. In this case, coating of the first element body surface and the second element body surface becomes easy.

In order to solve the problems described above, another objective lens unit for an optical pickup device of the invention has: (a) a first optical element having a first element body which is to be disposed at the optical information recording medium side and a first annular portion that is formed on the outer periphery of the first element body; and (b) a second optical element having a second element body which is to be disposed at the light source side of the first element body and a second annular portion which is formed on the outer periphery of the second element body, and is joined with the first annular portion, and in at least one portion of the outer periphery of the second annular portion, the exterior is smaller at the light source side than at the optical information recording medium side.

In the above-described objective lens unit, because in at least one portion of the outer periphery of the second annular portion that is formed on the second optical element, the exterior is smaller at the light source side than at the optical information recording medium side, the optical side portion of the second annular portion whose exterior is smaller is used to fix the objective lens unit into the holder. As a result, the size of the portion of the holder that supports the objective lens unit can be made smaller. In particular, in the case for example, where the objective lens unit is fixed to the front end of the small cylindrical holder which is the type in which the actuator coil is mounted on the periphery, the size of the holder itself can be made smaller, and thus the movable portion which includes the objective lens unit and the holder can be made lighter and functions such as responsiveness of the optical pickup device can be improved.

In a specific aspect of this invention, in the above objective lens unit, the outer diameter at the light source side of the second annular portion is smaller than the outer diameter of the optical information recording medium side of said second annular portion. In this case, a simple configuration in which the outer diameter is reduced at the light source side is possible, and manufacture of the second optical element and the like becomes simple.

In another specific aspect of this invention, the second annular portion has a step comprising a step surface which faces toward the light source side at the outer periphery. In this case, alignment in the axial direction using the step surface becomes possible.

In another specific aspect of this invention, the first annular portion is a cylinder having a first projection which projects further to the light source side than the outer periphery of the first element body, and the second annular portion is a cylinder having a second projection which projects further to the optical information recording medium side than the outer periphery of the second element body. In this case, the first and second projections are used to join the first and second optical elements.

In yet another specific aspect of this invention, the outer diameter of the optical information recording medium side end of the second projection is larger than the outer diameter of light source side end of the first projection. In this case, the bonding agent can be held using the outer diameter difference between the first and second projection and the efficiency of the bonding operation for the first and second optical elements can be improved. In addition, the outer diameter of the second projection is larger than the outer diameter of the first projection, and thus bonding becomes possible while the second optical element which has a tendency to have a large diameter is positioned at the lower side and the efficiency of the bonding operation is improved.

In another specific aspect of the invention, the inner diameter of the optical information recording medium side end of the second projection is larger than the inner diameter of the base portion which is the light source side end of the second projection. In this case, coating of the second element body surface becomes easy. It is to be noted that in the case of similar conditions, it is preferable that the inner diameter of the light source side end of the first projection is larger than the inner diameter of the base portion which is the optical information recording medium side end of the first projection.

In another specific aspect of this invention, the second projection has an end surface which supports the end surface of the light source side of the first projection at the optical information recording medium side. In this case, alignment in the axial direction of the first and second element bodies using the end surface becomes possible.

Furthermore in another specific aspect of the invention, the second annular member has notches in at least multiple locations on the outer peripheral portion at the light source side. In this case, the notches can be used when fixing the objective lens unit in the holder.

In another specific aspect of the invention, the first and second optical elements are respectively formed integrally using transparent resins to correspond to the objective wavelength. In this case, the objective lens can be light and processing efficiency is increased.

The first optical pickup device of this invention has: (a) the above-described objective lens unit for forming a spot on the recording surface of the optical information recording medium; (b) a holder which has a cylindrical configuration and has a fixing portion for fixing the objective lens unit by fitting the objective lens unit in from the second optical element side; and (c) can read the information on the optical information recording medium or alternatively, write information on the optical information recording medium.

In the above described optical pickup device, the holder can be made compact without compromising the performance of the objective lens unit or mounting properties of the holder, and thus a highly accurate and reliable optical pickup device can be provided.

The second optical pickup device of this invention has: (a) a cylindrical holder in which the drive actuator portion can be mounted on the outer periphery; (b) a first optical element having a first element body which is to be disposed at the optical information recording medium side and a first annular portion that is formed on the outer periphery of the first element body; and (c) a second optical element having a second element body which is to be disposed at the light source side of the first element body and a second annular portion which is formed on the outer periphery of the second element body and is joined with the first annular portion, and the second annular portion has a fitting portion which fits into the inner surface of one end of the holder and a large diameter portion which has a larger dimension than the inner dimension of the holder and a smaller dimension than the outer dimension of the holder.

The above optical pickup device has a fitting portion which fits into the inner surface of one end of the holder on the second annular portion that is formed on the second optical element and a large diameter portion which has a larger dimension than the inner dimension of the holder and a smaller dimension than the outer dimension of the holder. Thus the size of the portion of the holder that supports the objective lens unit can be made smaller in accordance with the dimensions of the fitting portion. As a result, the movable portion including the objective lens unit and the holder can be made lighter and the performance of the optical pickup device is improved.

The third optical pickup device of this invention has: (a) a cylindrical holder in which the drive actuator portion can be mounted on the outer periphery; (b) a first optical element having a first element body which is to be disposed at the optical information recording medium side and a first annular portion that is formed on the outer periphery of the first element body; and (c) a second optical element having a second element body which is to be disposed at the light source side of the first element body and a second annular portion which is formed on the outer periphery of the second element body and is joined with the first annular portion, and the outer periphery of the second annular portion has an engaging portion having a step which contacts one end of the holder.

In the optical pickup device, because the outer periphery of the second annular portion that is formed on the second optical element has an engaging portion having a step which contacts one end of the holder, the size of the portion of the holder that supports the objective lens unit can be made smaller in accordance with the step of the fitting portion. As a result, the movable portion including the objective lens unit and the holder can be made lighter and the performance of the optical pickup device is improved.

FIRST EMBODIMENT

The following is a description of the assembly in which the objective lens unit of the first embodiment of this invention is incorporated.

FIG. 1 is a lateral cross-section of the movable lens assembly. The movable lens assembly 10 which is shown has the objective lens unit 20 as the objective optical system that is disposed toward the optical disk DK and cylindrical holder members 50 which supports the objective lens unit 20 at the front end and also perform displacement together with the objective lens unit 20.

The objective lens unit 20 has a first optical member 30 which is the optical element that is mainly for converging and a second optical member 40 which is the optical element that is mainly for correction and both optical elements 30 and 40 form a single unit by being joined together. The former, which is the first optical member 30 is a plastic resin product which is formed as a single unit and has the circular lens body 31 which is the element body and the flange portion 32 which is the annular portion that is formed on the periphery of the lens body 31. The latter which is the second optical member 40 is also a plastic resin product which is formed as a single unit, and this has the circular lens body 41 which is the element body and the flange portion 42 which is the annular portion that is formed on the periphery of the lens body 41.

In the first optical member 30, the lens body 31 is a comparatively large power meniscus lens in which the optical disk DK which is the optical information recording medium has a concave surface, and for example, a beam PL having a wavelength of 405 nm is condensed at numerical aperture NA 0.85 on the recording surface RS of the Blu-ray optical disk DK. Meanwhile the flange portion 32 has a ring-shaped projection 32c which projects toward the second optical member 40 side and the front end thereof is formed a ring-shaped step 32d in which the projection is lower toward the outer side. The step 32d includes a bonding surface 32a which is orthogonal to the optical axis OA and this is used for alignment in the optical axis OA direction or for preliminary alignment in the orthogonal direction to the optical axis OA direction.

Preliminary alignment herein refers to the operation of making the optical axis of the first and second optical members 30 and 40 substantially meet each other before performing the final fixing. The end surface 32j at the optical disk DK side of the flange portion 32 has an alignment mark AM1 which specifies the identification of the first optical member 30 (For example, the identification information, that is, which cavity of what number type, etc.).

The inner diameter of the light source side end of the projection 32c of the flange portion 32 is larger than the inner diameter of the base portion which is the optical disk DK side end. That is to say, the flange portion 32 or in other words the inside surface of projection 32c has a cone-like taper so as to be wider toward the light source side end. In this manner, the flange portion 32, or in other words the inside surface of the projection 32c is tapered so as to be wider toward the end, and thus uniform coating of the surface of the resin body 31 becomes easier.

Figure 3:
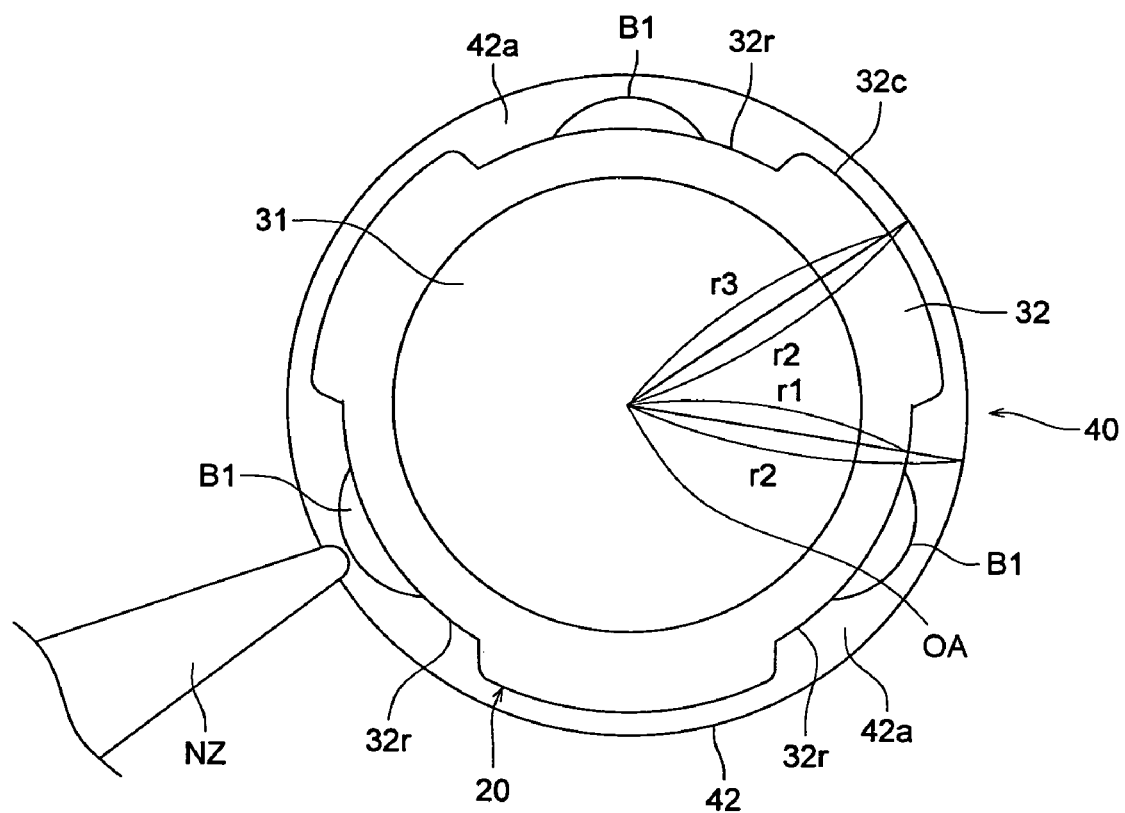
FIG. 3 shows an end elevation of the objective lens unit and the like of the first embodiment.

As shown in FIG. 3 as well, three concave portions 32r which extend in the optical axis direction OA of the first optical member 30 are formed at equal distance on the outer periphery of the projection 32c of the flange portion 32. Each of the concave portions 32r is a portion in which the radius is uniformly reduced at the cylindrical outer surface of the flange portion 32. In addition, because the inner diameter of the projection 32c is circular, each concave portion 32r is a portion which becomes thin locally at the projection 32c.

The flange portion 32 and the flange portion 42 of the optical member 40 are bonded and fixed by using a bonding agent B1 such as photo-cured resin with the bonding surfaces 32a and 42a in a state of contact with each other. Here, the radius r1 to the bottom of the concave portion 32r of the outer periphery surface of the flange portion 32 is smaller by a prescribed amount than the radius r2 of the portion corresponding to the concave portion 32r of the outer periphery surface of the flange portion 42. Due to this difference in dimensions, the contact surface 42a which is exposed at the rear of each concave portion 32r functions as a liquid reservoir for holding the bonding agent B1 when the first optical member 30 is fixed on the second optical member 40.

In the second optical member 40, the lens body 41 is a comparatively small power meniscus lens in which the disk DK side has a concave surface, and it works together with the lens body 31 of the first optical member 30 and is designed, for example, so as to correct convergence for a beam of a wavelength of 405 nm, and corrects the wave surface aberration using the Blu-ray system wavelength. Meanwhile the flange portion 42 has a ring-shaped projection 42c which projects toward the first optical member 30 side, and the front end has an edge 42d which is toward inside. This edge 42d works together with the step 32d which is provided at the first optical member 30 and functions as an auxiliary alignment means, and is used for alignment in the optical axis OA direction or for preliminary alignment in the direction orthogonal to the optical axis OA.

At the time of preliminary alignment, a portion of the front end of the flange portion 32 of the first optical member 30 is fitted into the front end of the flange portion 42 of the second optical member 40 and movement in the lateral direction of the outer surface of the projection 32c of the first optical member 30 side over an extremely small space is permitted by the inside surface of the edge 42d of the second optical member 40 side. That is to say, in the preliminary alignment, extremely small movement is permitted in the direction orthogonal to the optical axis OA of the first optical member 30.

The inner diameter of the optical disk DK side end on the projection 42c of the flange portion 42 is larger than the inner diameter of the base portion which is the light source side end. That is to say, the flange portion 42, or in other words, the inside surface of the projection 42c has a cone taper which becomes larger toward the end portion of the optical disk DK side. In this manner, the flange portion 42, or in other words the inside surface of the projection 42c has a taper which becomes wider towards the end, and thus uniform coating on the surface of the lens body 41 becomes easier.

In addition, the exterior of the flange portion 42 has a cylindrical configuration, and is slightly larger overall than the exterior of the flange portion 32 of the first optical member 32. That is to say, the radius r3 of the maximum diameter portion of the outer periphery surface of the flange portion 32 excluding the concave portion is slightly smaller than the radius r2 of the outer periphery side surface of the flange portion 42. As a result, the flange portion 32 of the first optical member 30 can be stably supported on the flange portion 42. In addition, the outer periphery surface and the light source side end surface 42j of the flange portion 42 form an engaging portion which is used for connection with the holder member 50, and it is used for alignment when the flange portion 42 is inserted into the holder member 50 and fixed. An alignment mark AM2 which identifies the second optical member 40 is formed on a recess of the light source side end surface 42j of the flange portion 42.

The holder member 50 is a resin cylinder, and has a step 51a on the inner surface IS of the end portion 51. The light source side end surface 42j of the flange portion 42 of the second optical member 40 comes in contact with the step surface 51c which is orthogonal to the optical axis OA and provided at the step 51a. Alignment of the holder member 50 and the second optical member 40 in the optical axis OA direction and in the direction orthogonal thereto are achieved due to the fitting of the step 51a and the flange portion 42. The end surface 51d of the holder member 50 functions as a liquid reservoir for holding the bonding agent B2 when the flange portion 42 is fixed on the holder member 50.

The inner diameter of the holder member 50 is made approximately equal to or greater than the outer diameter of the lens body 41 of the second optical member 40 in view of the securing an optical path and lightening the device. Meanwhile, the outer diameter of the holder member 50 is larger than the outer diameter of the flange portion 42 in view of strength of the holder member 50 but in order to prevent the weight of the holder member 50 from becoming too much, the amount extending from the outer surface of the flange portion 42 is minimized. In addition, the support portion 51e which extends to the front end side from the step 51a that is provides at the end portion 51 which is the fixing portion is a portion which essentially fixes the objective lens unit 20 and needs a thickness exceeding a specific amount. Meanwhile, if the outer diameter of the flange portion 42 is too small, the strength of the flange portion 42 is reduced, and harmful effects due to warping of the lens body 41 occur. Thus, the outer diameter of the flange portion 42 is made to be about halfway between the inner diameter and the outer diameter of the holder member 50, and strength and accuracy in fixing the holder member 50 and the flange portion 42 to each other are ensured. Consequently, because the outer diameter of the flange portion 42 is minimized in view of ensuring strength, there is a tendency for the difference compared with the outer diameter of the flange portion 32 of the first optical member 30 to be eliminated. Thus, concave portions 32r are provided at 3 locations of the outer periphery surface of the flange portion 42, and bonding agent B1 can be kept here. Thus, a supply place for the bonding agent B1 is secured and the operational efficiency for the bonding of the first optical member 30 and second optical member 40 is improved.

In a specific manufacturing example, the diameter of the lens body 41 is about 5 mm and the inner diameter of the holder member 50 is also about 5 mm to correspond with this. In addition, the thickness of the holder member 50 is about 0.5 mm. Meanwhile, the thickness of the flange portion 42 of the second optical member 40 is about 0.4 mm at most. Further, the protrusion width of the bonding surface 42a of the flange portion 42 from the maximum diameter portion of the flange portion 32 (dimension difference r2–r3 in FIG. 3) is approximately 0.1 mm, and the protrusion width of the contact-surface 42a from the bottom of the concave portion 32r of the flange portion 32 (dimension difference r2–r1 in FIG. 3) is approximately 0.3 mm.

In the case where a laser beam of a wavelength of 405 nm for BD (Blu-ray optical disc) is irradiated from the light source onto the objective lens unit 20, the laser beam passes through the lens body 31 and the lens body 41 and is condensed as a spot on the recording surface RS of the optical disk DK. In other words, it becomes possible to form image from the BD laser beam with a desired accuracy using the objective lens unit 20, and the laser beam can be used as the information reading beam or the information recording beam for the optical disks. At this time, the flange portion 32 of the first optical member 30 is provided with concave portions 32r and the comparatively small diameter of holder member 50 is kept and fixing of the first optical member 30 and the second optical member 40 is ensured. As a result, the holder 50 is lightened and tracking accuracy is improved.

The following is a description of the assembly of the objective lens unit 20 with reference to FIG. 3. First, the second optical member 40 is mounted on a stage (not shown) including a chuck or the like, and the first optical member 30 is mounted on the second optical member 40 such that the projections 32c and 42c (see FIG. 1) oppose each other. At this time by fitting a portion of the flange portion 32 or in other words the front end of the projection 32c of the first optical member 30 into the flange portion 42, or in other words, the front end of the projection 42c of the second optical member 40 side, preliminary alignment of the first and second optical members 30 and 40 is performed. Next, by observation using a microscope, the first optical member 30 is moved by an extremely small dimension in the direction orthogonal to the optical axis OA on the second optical member 40 and held, and thereby accurate alignment of the both optical members 30 and 40 is performed. In this state, a nozzle NZ is used to supply the bonding agent B1 which is a photo-cure resin to the bonding surface 42a of the flange 42 which is exposed in an arc-like configuration at the position of the concave portion 32r of the second optical member 40. Subsequently, the bonding agent B1 is irradiated with ultraviolet light, and cured to a desired strength. As a result, the first and second optical members 30 and 40 are aligned with each other and fixed and the objective lens unit 20 is completed.

The objective lens unit 20 in FIG. 3 is fitted into the end 51 of the holder member 50 shown in FIG. 1 from the second optical member 40 side and, like the first and second optical members 30 and 40, are fixed to the holder member 50 by the supplying the bonding agent B2 and by ultraviolet radiation.

SECOND EMBODIMENT

The following is a description of the assembly in which the objective lens unit of the second embodiment of this invention is incorporated.

Figure 2:
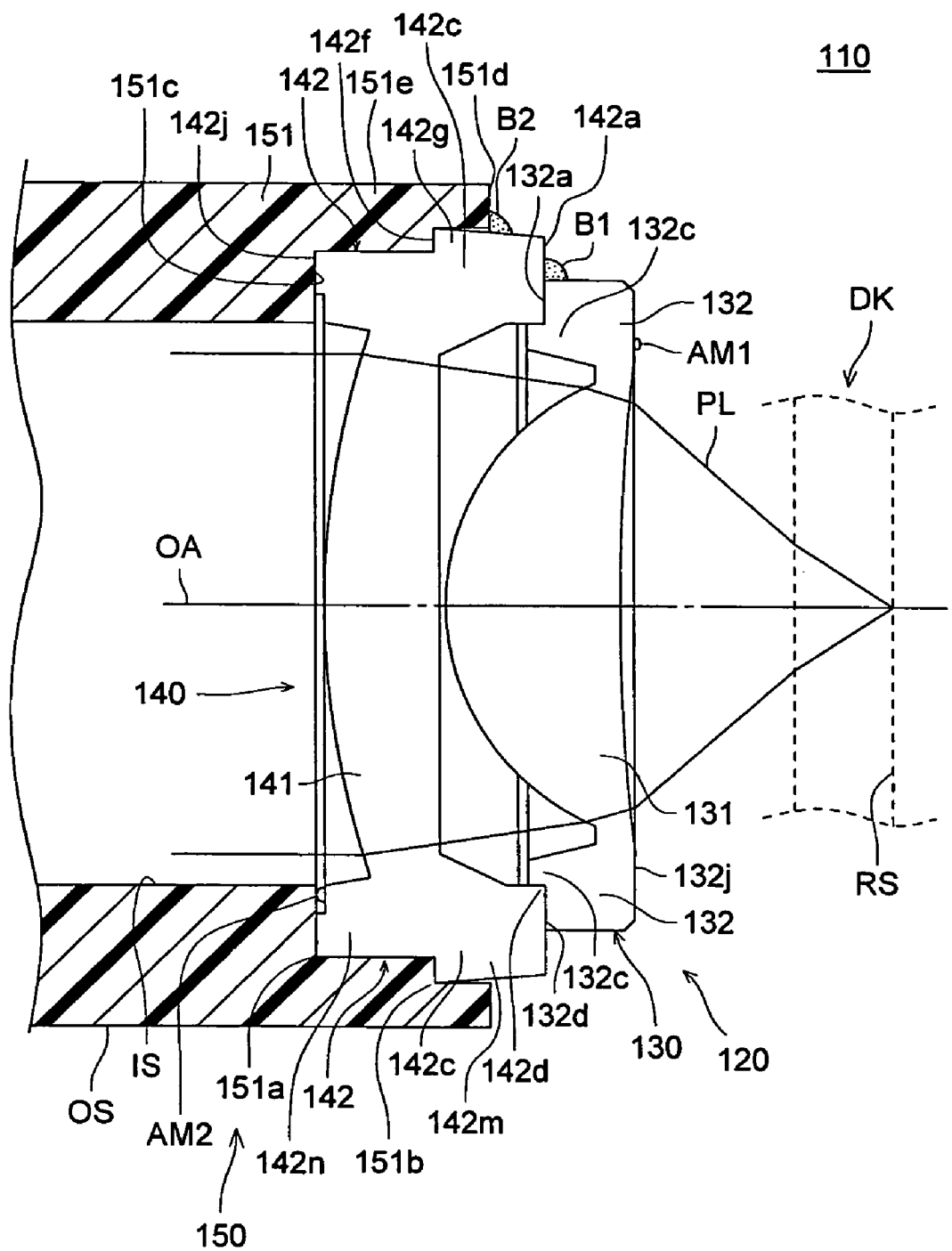
FIG. 2 shows a lateral cross-section of the objective lens unit and the like of the second embodiment.

FIG. 2 is a lateral cross-section of the movable lens assembly. The movable lens assembly 110 which is shown has the objective lens unit 120 as the objective optical system that is disposed toward the optical disk DK and cylindrical holder members 150 which supports the objective lens unit 120 at the front end and also perform displacement together with the objective lens unit 120.

The objective lens unit 120 has a first optical member 130 which is the optical element that is mainly for converging and a second optical member 140 which is the optical element that is mainly for correction and both optical elements 130 and 140 form a single unit by being joined together. The former, which is the first optical member 130 is a plastic resin product which is formed as a single unit and has the circular lens body 131 which is the element body and the flange portion 132 which is the annular portion that is formed on the periphery of the lens body 131. The latter which is the second optical member 140 is also a plastic resin product which is formed as a single unit, and this has the circular lens body 141 which is the element body and the flange portion 142 which is the annular portion that is formed on the periphery of the lens body 141.

In the first optical member 130, the lens body 131 is a comparatively large power meniscus lens in which the optical disk DK which is the optical information recording medium has a concave surface, and for example, a beam PL having a wavelength of 405 nm is condensed at numerical aperture NA 0.85 on the recording surface RS of the Blu-ray optical disk DK. Meanwhile the flange portion 132 has a ring-shaped projection 132c which projects toward the second optical member 140 side and the front end thereof is formed a ring-shaped step 132d in which the projection is lower toward the outer side. The step 132d includes a bonding surface 132a which is orthogonal to the optical axis OA and this is used for alignment in the optical axis OA direction or for preliminary alignment in the orthogonal direction to the optical axis OA direction.

Preliminary alignment herein refers to the operation of making the optical axis of the first and second optical members 130 and 140 substantially meet each other before performing the final fixing. The end surface 132j at the optical disk DK side of the flange portion 132 has an alignment mark AM1 which specifies the identification of the first optical member 130 (For example, the identification information, that is, which cavity of what number type, etc.).

The inner diameter of the light source side end of the projections 132c of the flange portion 132 is larger than the inner diameter of the base portion which is the optical disk DK side end. That is to say, the flange portion 132 or in other words the inside surface of projection 132c has a cone-like taper so as to be wider toward the light source side end. In this manner, the flange portion 132, or in other words the inside surface of the projection 132c is tapered so as to be wider toward the end, and thus uniform coating of the surface of the resin body 131 becomes easier.

In the second optical member 140, the lens body 141 is a comparatively small power meniscus lens in which the disk DK side has a concave surface, and it works together with the lens body 131 of the first optical member 130 and is designed, for example, so as to correct convergence for a beam of a wavelength of 405 nm, and corrects the wave surface aberration using the Blu-ray system wavelength. Meanwhile the flange portion 142 has a ring-shaped projection 142c which projects toward the first optical member 130 side, and the front end has an edge 142d which is toward inside. This edge 142d works together with the step 132d which is provided at the first optical member 130 and functions as an auxiliary alignment means, and is used for alignment in the optical axis OA direction or for preliminary alignment in the direction orthogonal to the optical axis OA.

At the time of preliminary alignment, a portion of the front end of the flange portion 132 of the first optical member 130 is fitted into the front end of the flange portion 142 of the second optical member 140 and movement in the lateral direction of the outer surface of the projection 132c of the first optical member 130 side over an extremely small space is permitted by the inside surface of the edge 142d of the second optical member 140 side. That is to say, in the preliminary alignment, extremely small movement is permitted in the direction orthogonal to the optical axis OA of the first optical member 130.

By using the a bonding agent B1 which is a photo-cure resin or the like, the flange portion 132 of the first optical member 130 and the flange portion 142 of the second optical member 140 are bonded and fixed, while the bonding surface 132a and 142a are in a state in which they are in contact with each other. Here, the outer diameter of the bonding surface 142a of the flange portion 142 is larger than the outer diameter of the bonding surface 132a of the flange portion 132, and the extended bonding surface 142a functions as a liquid reservoir for holding the bonding agent B1 when the first optical member 130 is fixed on the second optical member 140.

The inner diameter of the optical disk DK side end on the projection 142c of the flange portion 142 is larger than the inner diameter of the base portion which is the light source side end. That is to say, the flange portion 142, or in other words, the inside surface of the projection 142c has a cone taper which becomes larger toward the end portion of the optical disk DK side. In this manner, the flange portion 142, or in other words the inside surface of the projection 142c has a taper which becomes wider towards the end, and thus uniform coating on the surface of the lens body 141 becomes easier.

Furthermore, the outer diameter of the light source side of the flange portion 142 is smaller than the outer diameter of the optical disk DK side. More specifically, the flange portion 142 has a step 142g which has a step surface 142f which is formed so as to face the light source side on the outer periphery thereof. The step 142g is formed at about the middle position along the optical axis OA on the outer periphery of the flange portion 142. On the flange portion 142, this step 142g is the border that separates the large diameter portion 142m of the optical disk DK side from the fitting portion 142n of the light source side. The fitting portion 142n and the step 142g form an engaging portion that is used for connection with the holder member 150 and also used at the time of alignment while the flange portion 142 is inserted into the holder member 150 and fixed. An alignment mark AM2 which identifies the second optical member 140 is formed on the concave portion of the light source side end surface 142j of the flange portion 142.

The holder member 150 is a resin cylinder, and has two step levels 151a and 151b on the inner surface IS of the end portion 151 which is a fixing portion for the objective lens unit 120. The light source side end surface 142j of the flange portion 142 of the second optical member 140 comes in contact with the step surface 151c which is orthogonal to the optical axis OA and provided at one step 151a and the step 142f of the outer periphery of the flange portion 142 is disposed adjacent to the step surface, that is orthogonal to the optical axis OA, of the other step 151b. Alignment of the holder member 150 and the second optical member 140 in the optical axis OA direction and in the direction orthogonal thereto is achieved by fitting together of the step 151a and the front end portion of the fitting portion 142n. The end surface 151d of the holder member 150 functions as a liquid reservoir for holding the bonding agent B2 when the flange portion 142 is fixed on the holder member 150.

The inner diameter of the holder member 150 is made approximately equal to or greater than the outer diameter of the lens body 141 of the second optical member 140 in view of the securing an optical path and lightening the device. Meanwhile, the outer diameter of the holder member 150 is larger than the outer diameter of the flange portion 142 in view of strength of the holder member 150, but in order to prevent the weight of the holder member 150 from becoming too much, the amount extending from the outer surface of the flange portion 142 is minimized. In addition, the support portion 151e which extends to the front end side from the step 151a that is provides at the end portion 151 which is the fixing portion is a portion which essentially fixes the objective lens unit 120 and needs a thickness exceeding a specific amount. Meanwhile, if the outer diameter of the flange portion 142 is too small, the strength of the flange portion 142 is reduced, and harmful effects due to warping of the lens body 141 occur. Thus, the outer diameter of the flange portion 142 is made to be about half way between the inner diameter and the outer diameter of the holder member 150, and strength and accuracy in fixing the holder member 150 and the flange portion 142 to each other are ensured.

In a specific manufacturing example, the diameter of the lens body 141 is about 5 mm and the inner diameter of the holder member 150 is also about 5 mm to correspond with this. In addition, the thickness of the holder member 150 is about 0.5 mm. Meanwhile, the thickness of the flange portion 142 of the second optical member 140 is about 0.4 mm at most, and the width in the direction orthogonal to the optical axis OA of the step 142g is around 0.15 mm. Further, the protrusion width of the bonding surface 142a of the flange portion 142 from the outer diameter of the flange portion 132 is approximately 0.25 mm.

In the case where a laser beam of a wavelength of 405 nm for BD (Blu-ray optical disc) is irradiated from the light source onto the objective lens unit 120, the laser beam passes through the lens body 131 and the lens body 141 and is condensed as a spot on the recording surface RS of the optical disk DK. In other words, it becomes possible to form image from the BD laser beam with a desired accuracy using the objective lens unit 120, and the laser beam can be used as the information reading beam or the information recording beam for the optical disks. At this time, the flange portion 142 of the second optical member 140 is provided with a step 142g and the comparatively small diameter of holder member 150 is kept and fixing of the first optical member 130 and the second optical member 140 is ensured. As a result, the holder 150 is lightened and tracking accuracy is improved.

Figure 4:
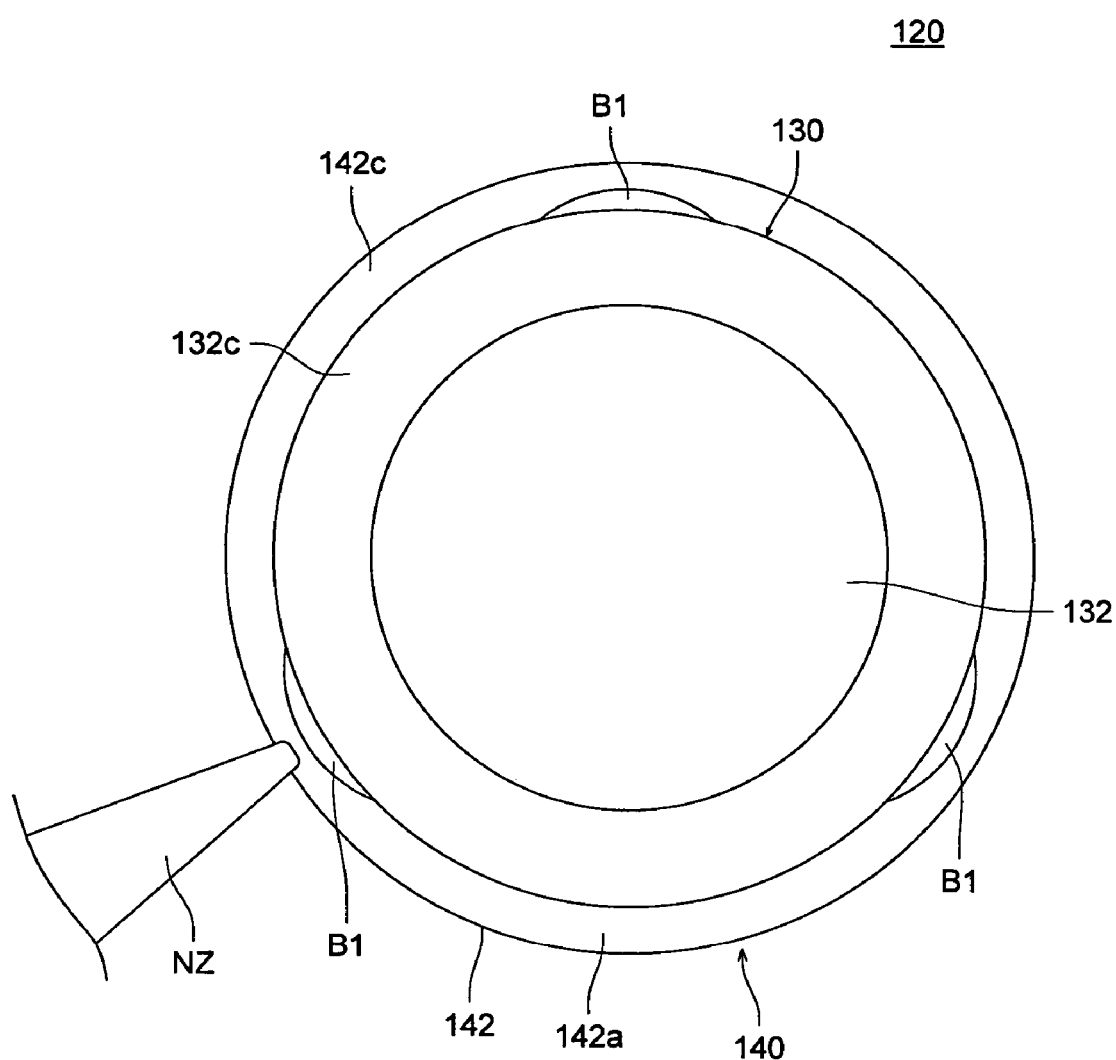
FIG. 4 shows an end elevation of the objective lens unit and the like of the second embodiment.

FIG. 4 is diagram for describing the assembly of the objective lens unit 120. First, the second optical member 140 is mounted on a stage (not shown) including a chuck or the like, and the first optical member 130 is mounted on the second optical member 140 such that the projections 132c and 142c (see FIG. 2) oppose each other. At this time, by fitting a portion of the front end of the flange portion 132 of the first optical member 130 into the front end of the flange 142 of the second optical member 140 side, preliminary alignment of the first and second optical members 130 and 140 is performed. Next, by observation using a microscope, the first optical member 130 is moved by an extremely small dimension in the direction orthogonal to the optical axis on the second optical member 140 and held, and accurate alignment of the both optical members 130 and 140 is performed. In this state, a nozzle NZ is used to supply the bonding agent B1 which is a photo-cure resin to suitable locations (three locations in the example shown) on bonding surface 142a of the flange 142 which is exposed at the periphery of the second optical member 140. Subsequently, the bonding agent B1 is irradiated with ultraviolet light, and hardened to a desired strength. As a result, the first and second optical members 130 and 140 are aligned with each other and fixed, and then the objective lens unit 120 is completed.

The objective lens unit 120 in FIG. 4 is fitted into the end 151 of the holder member 150 shown in FIG. 2 from the second optical member 140 side and, like the first and second optical members 130 and 140, are fixed to the holder member 150 by the supplying the bonding agent B2 and by ultraviolet radiation.

Figure 5:
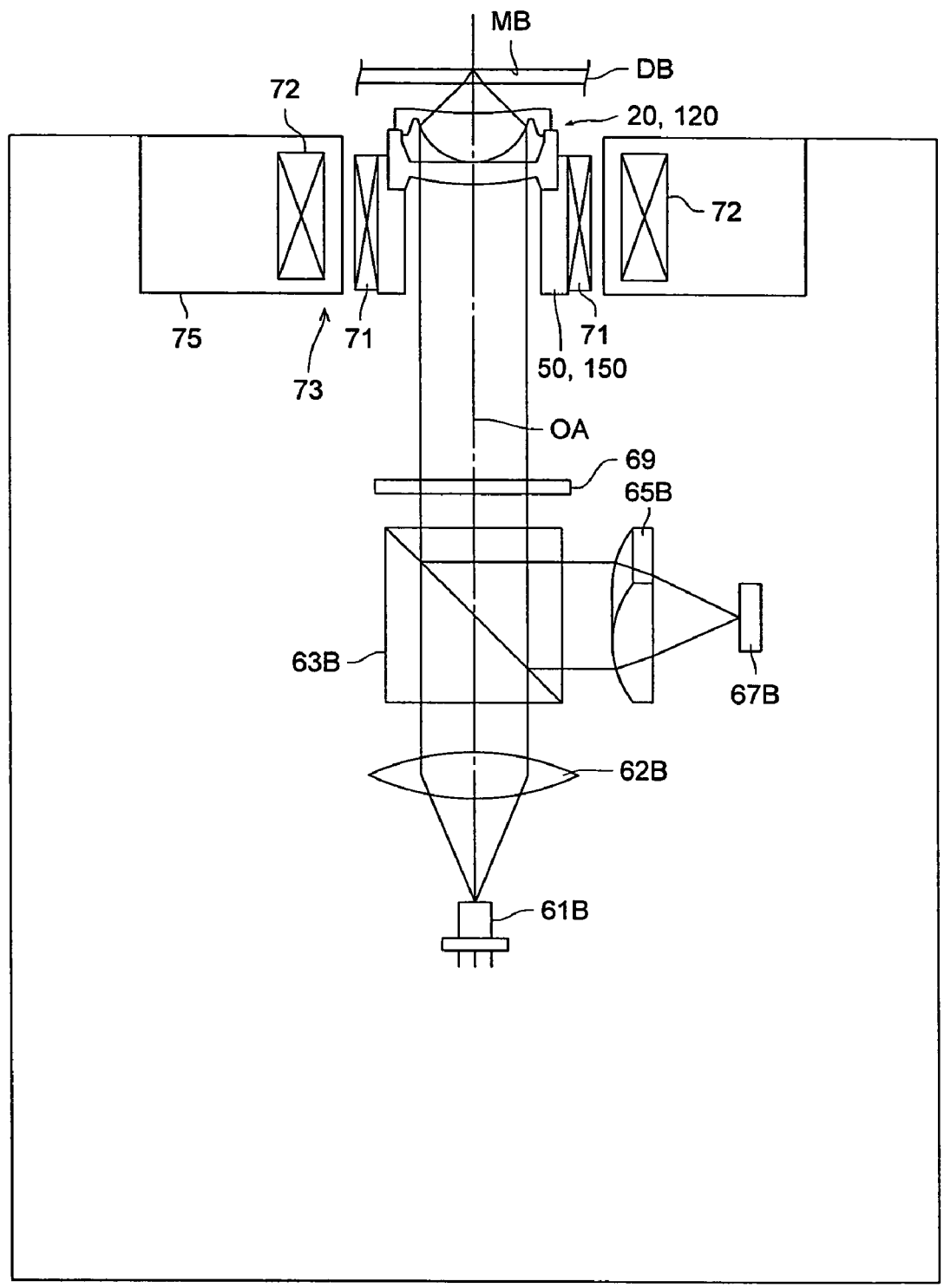
FIG. 5 shows a structural example of an optical pickup device including the objective lens unit and the like of FIG. 1 and FIG. 2.

FIG. 5 schematically shows the configuration of the optical pickup device in which the objective lens unit 20, 120 respectively shown in FIG. 1 and FIG. 2 is incorporated.

The following is description of the optical pickup device. The laser beam from the semiconductor laser 61B uses the objective lens unit 20, 120 and is irradiated on the optical disk DB which is the optical information recording medium and the light reflected from the optical disk DB is ultimately led to the light detection device 67B via the objective lens unit 20, 120. The semiconductor laser 61B generates the laser bean (for example a wavelength of 405 nm) for reproducing the information on the optical disk DB, and this laser beam is condensed by the objective lens unit 20, 120, and a spot corresponding to NA 0.85 is formed on the information recording surface MB. In addition, the light detection device 67B detects the information recorded on the optical disk DB as optical signals (such as wavelength of 405 nm).

First, when the optical disk DB is played, the laser beam having a wavelength of 405 nm, for example, is emitted from the semiconductor laser 61B and the emitted light flux is collimated by the collimator 62B. This light flux is passed through a polarizing beam splitter 63B and a quarter wavelength plate 69 and then condensed on the information recording surface MB which is the optical disk DB by the objective lens unit 20, 120.

The light flux which is modulated by information bit at the information recording surface MB and then reflected, is passed through the objective lens unit 20, 120 once again, and entered into the polarizing beam splitter 63B and the like and reflected, astigmatized by the cylindrical lens 65B, entered on the light detection device 67B, and the output signal is used for obtaining the signal for reading the information recorded on the optical disk DB.

In addition, changes in light amount due to spot shape changes and position changes are detected by the light detection device 67B and focus detection and track detection are performed. The secondary actuator 73 which has the actuator portion 71 which includes a coil that is provided on the outer periphery of the holder member 50, 150 which holds the objective lens unit 20, 120, and the actuator portion 72 which includes a magnet or the like which is provided at the fixing member 75, is operated based on the detections. That is to say, the second actuator 73 moves the objective lens unit 20, 120 in the direction of the optical axis OA such that the light flux from the semiconductor laser 61B is allowed to form an image on the information recording surface MB of the optical disk DB and the objective lens unit 20, 120 is moved in the direction orthogonal to the optical axis OA such that the light flux from the semiconductor laser 61B is allowed to form an image on a prescribed track. The actuator portion 71 that is provided on the outer periphery of the holder member 50, 150 may be one that is directly fixed to the outer periphery of the holder member 50, 150, but it may also be fixed via some other member.

The above is a description of the case in which information from the optical disk DB is reproduced, but also in the case where information is recorded on the optical disk DB, the optical system shown in FIG. 5 operates in a similar manner. However, the intensity of the laser beam emitted from the semiconductor laser 61B is set so as to be greater than a prescribed threshold for recording. In addition, the sequence of tracking, focusing and checking written information at the time of writing can be suitably changed in accordance with the use and specification of the optical pickup device.

THIRD AND FOURTH EMBODIMENT

The following is a description of the objective lens unit of the third and fourth embodiments. The objective lens unit of the third embodiment is one in which that of the first embodiment is modified, and the parts that are not described are those which are the same as those of the first embodiment. Similarly, the objective lens unit of the fourth embodiment is one in which that of the second embodiment is modified, and the parts that are not described are those which are the same as those of the second embodiment.

Figure 6:
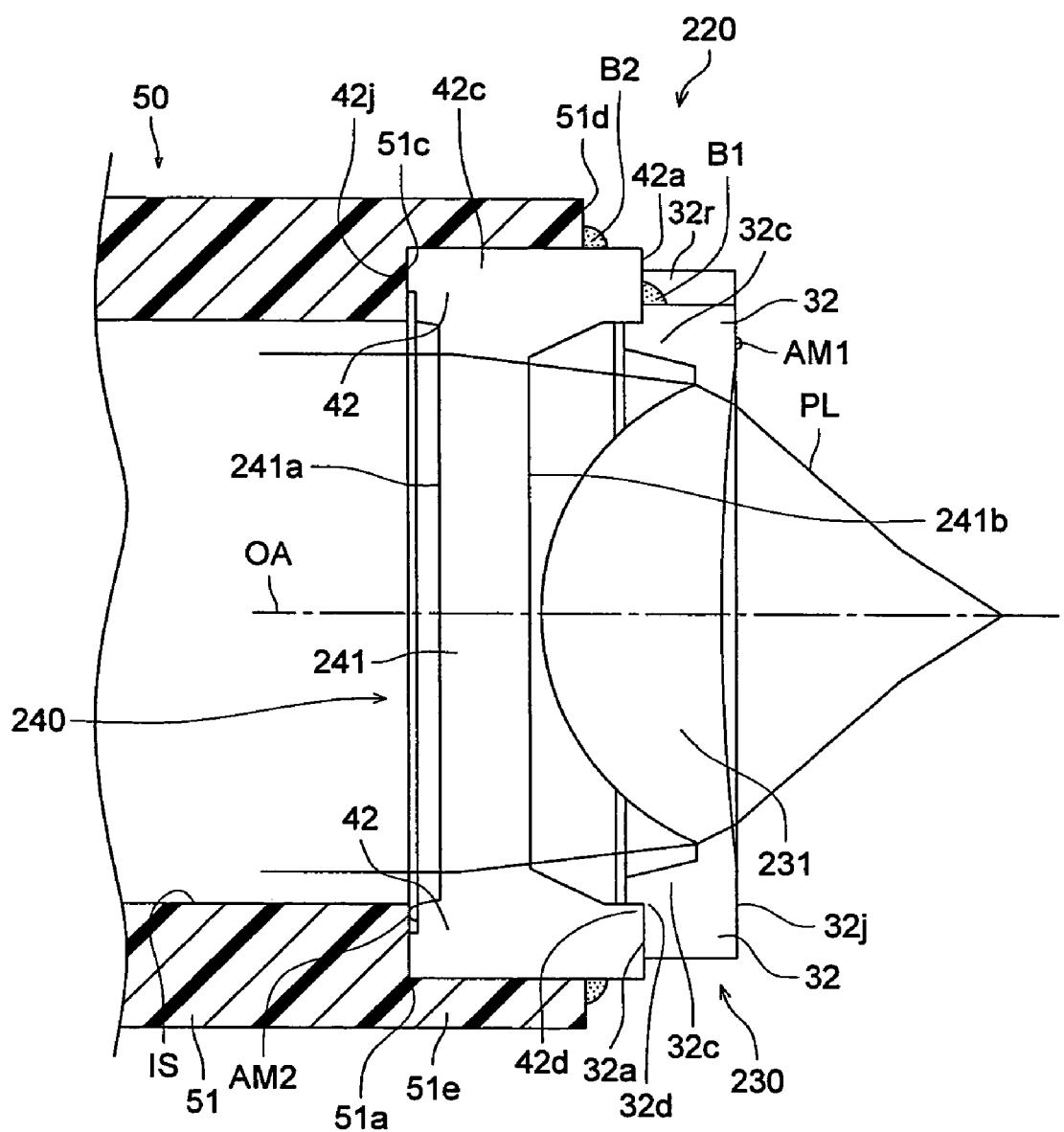
FIG. 6 shows a lateral cross-section of the objective lens unit and the like of the third embodiment.
Figure 7:
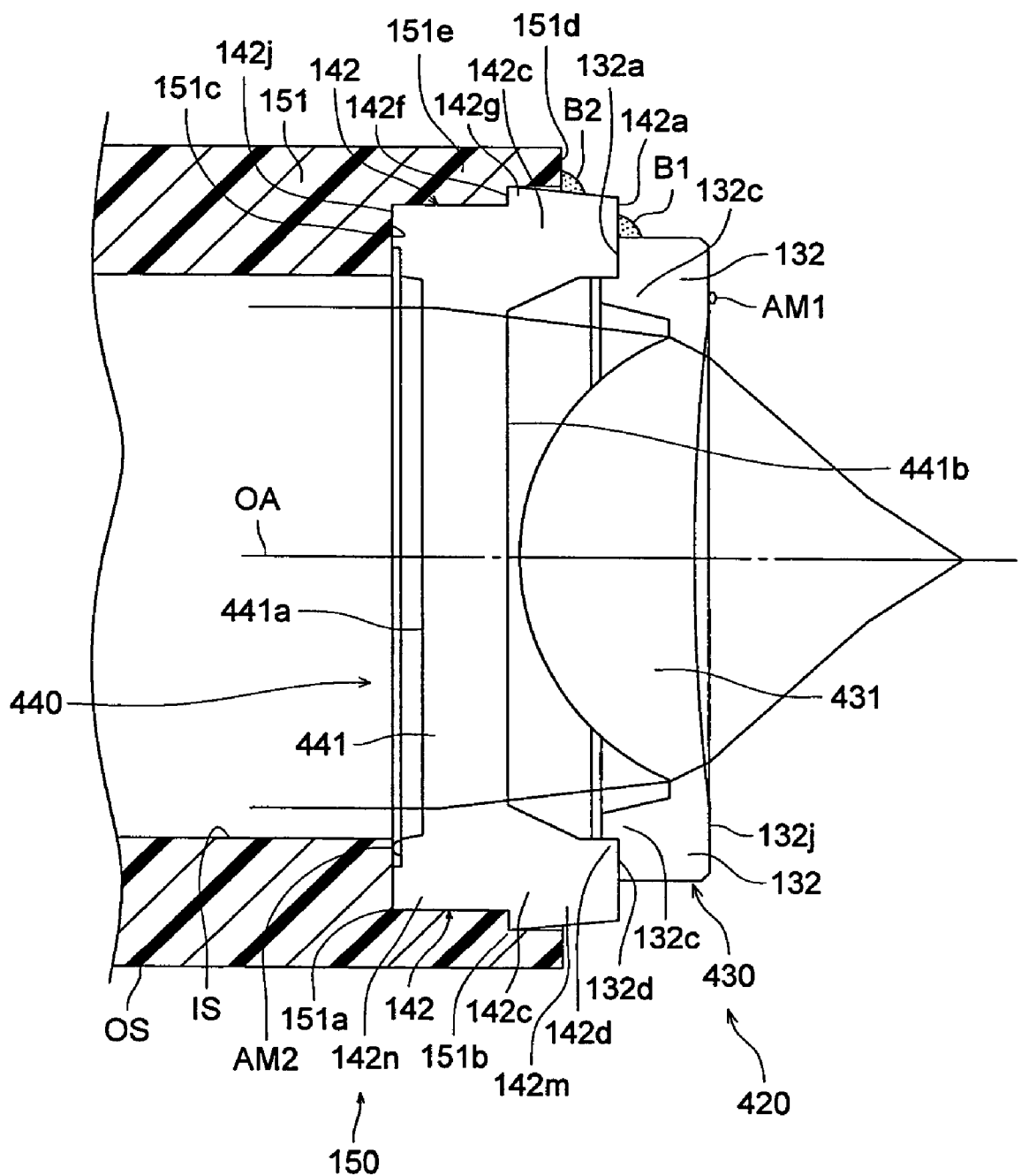
FIG. 7 shows a lateral cross-section of the objective lens unit and the like of the fourth embodiment.

FIG. 6 and FIG. 7 are lateral cross-sections of the movable lens assembly in which the objective lens units of the third embodiment and the fourth embodiment are incorporated respectively. The objective lens unit 220, 420 of the third embodiment and fourth embodiment respectively has a first optical member 230, 430 which is the objective lens for condensing and a second optical member 240, 440 which is a wavelength compatible diffraction lens.

The lens body 231, 431 of the first optical member 230, 430 is an aspheric lens and the diffracted light or the non-diffracted light that is formed corresponding to the three different wavelengths that pass through the second optical member 240, 440 is respectively condensed on a prescribed location of the optical disks.

Because the diffraction element body 241, 441 of the second optical member 240, 420 has respective phase structures on the first surface 241a, 441a of the rear side with respect to the lens body 231, 431 and second surface 241b, 441b of the front side with respect to the lens body 231, 431, diffraction light can be formed which converges or diverges at a desired amount for light used for a prescribed wavelength.

More specifically, the first surfaces 241a and 441a of the diffraction element body 241, 441 have diffraction properties for laser beams having the wavelength of 655 nm for DVD, but does not have diffraction properties for laser beams having the wavelength of 405 nm for BD or laser beams having the wavelength of 780 nm for CD. On the other hand, the second surfaces 241b and 441b have diffraction properties for laser beams having the wavelength of 780 nm for CD, but does not have diffraction properties for laser beams having the wavelength of 405 nm for BD and for laser beams having the wavelength of 655 nm for DVD. It is to be noted that the lens body 231, 431 is designed for the laser beams having the wavelength of 405 nm for BD.

In the case where 655 nm wavelength laser beams for DVD are entered from the light source side (left side of the drawing) into the objective lens unit 220, 420, the laser beams are subjected to suitable convergence or divergence at a prescribed power depending on the diffraction effect at the first surface 241a, 441a of the diffraction element body 241, 441, and then condensed on the information recording surface (not shown) of the DVD which is at the right side of the drawing, via the lens body 231, 431. In addition, in the case where laser beams having 780 nm wavelength for CD are entered from the light source side into the objective lens unit 220, 420, the laser beams are subjected to suitable convergence or divergence at a prescribed power depending on the diffraction effect at the second surfaces 241b and 341b of the diffraction element body 241, 441, and then condensed on the information recording surface (not shown) of the CD which is at the right side of the drawing, via the lens body 231, 431. It is to be noted that in the case where 405 nm wavelength laser beams for BD are entered from the light source side into the objective lens unit 220, 420, they pass through without being diffracted at the diffraction element body 241, 441, and then are focused on the information recording surface (not shown) of the BD which is at the right side of the drawing, via the lens body 231, 431. That is to say, in the case of this embodiment, by combination of the first optical member 230, 430 and the optical member 240, 440, compatible imaging with the desired accuracy for the CD, DVD and BD laser beams become possible and the lasers can be used as information reading beams or information recording beams for the optical disks.

Figure 8:
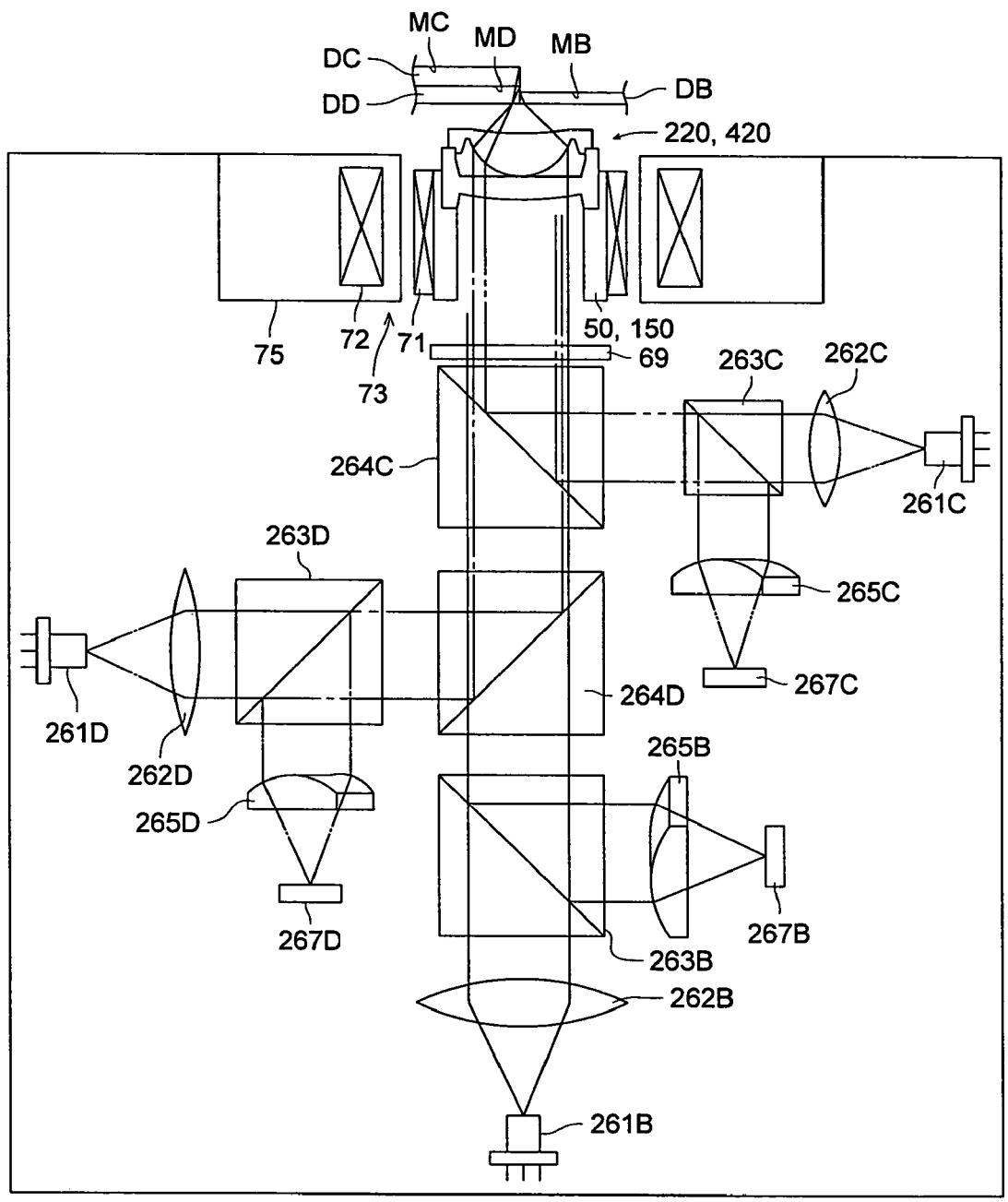
FIG. 8 shows a structural example of an optical pickup device including the objective lens unit and the like of FIG. 6 and FIG. 7.

FIG. 8 schematically shows the structure of the optical pickup device that is incorporated in the objective lens unit 220, 420 respectively shown in FIG. 6 and FIG. 7.

The following is description of the main features of the optical pickup device. The laser beams from the semiconductor lasers 261B, 261D and 261C are irradiated on the optical disks DB, DD, and DC which are optical information recording mediums using the objective lens unit 220, 420, and the beam reflected from the optical disks DB, DD, and DC are ultimately led to the light detection devices 267B, 267D and 267C via the common objective lens unit 220, 240.

The first semiconductor laser 261B generates laser beams for reproducing information on the first optical disk DB (such as BD wavelength of 405 nm), and condenses the laser beams using the objective lens unit 220, 420 and a spot corresponding to NA 0.85 is formed on the information recording surface MB. The second semiconductor laser 261D generates laser beams for reproducing information on the second optical disk DD (such as DVD wavelength of 655 nm), and subsequently the laser beam is condensed by the objective lens unit 220, 420 and a spot corresponding to NA 0.65 is formed on the information recording surface MD. The third semiconductor laser 261C generates laser beams for reproducing information on the third optical disk DC (such as CD wavelength of 780 nm), and subsequently condensed the laser beams by the objective lens unit 220, 420 and a spot corresponding to NA 0.51 is formed on the information recording surface MC. In addition, the first optical detection device 267B detects the information recorded on the first optical disk DB as optical signals (such as the BD wavelength of 405 nm); the second optical detection device 267D detects the information recorded on the second optical disk DD as optical signals (such as the DVD wavelength of 665 nm); and the third optical detection device 267C detects the information recorded on the third optical disk DC as optical signals (such as the CD wavelength of 780 nm).

First, when the first optical disk DB is played, the laser beam having a wavelength of 405 nm, for example, is emitted from the first semiconductor laser 261B and the emitted light flux converted to a parallel light flux by the collimator 262B. This light flux is passed through polarizing beam splitters 263B, 264D, 264C and a quarter wavelength plate 69 and then condensed on the information recording surface MB which is the first optical disk DB by the objective lens unit 220, 420.

The light flux which is modulated by information bit at the information recording surface MB and then reflected is passed through the objective lens unit 220, 420 and the like once again, and entered into the polarizing beam splitter 263B and reflected, astigmatized by the cylindrical lens 265B, entered on the first light detection device 267B, and the output signal is used to obtain the signal for reading the information recorded on the first optical disk DB.

In addition, changes in light amount due to changes in spot shape and position changes are detected on the first light detection device 267B and focus detection and track detection are performed. The secondary actuator 73 which has the actuator portions 71 and 72 moves the objective lens unit 220 in the direction of the optical axis OA such that the light flux from the first semiconductor laser 261B is allowed to form an image on the information recording surface MB of the first optical disk DB and the objective lens unit 220, 420 is moved in the direction orthogonal to the optical axis OA such that the light flux from the first semiconductor laser 261B is allowed to form an image on a prescribed track.

Next, in the case where the second optical disk DD is played, laser beams having a wavelength of 655 nm for example are emitted from the second semiconductor laser 261D, and the emitted light flux is converted to parallel light flux by the collimator 262D. This light flux is passed through a polarizing beam splitter 263D, and then reflected at the polarizing beam splitter 264D, and subsequently passed through the polarizing beam splitter 264C and then condensed on the information recording surface MD which is the second optical disk DD by the objective lens unit 220, 420.

The light flux which is modulated by information bit at the information recording surface MD and then reflected, is passed through the objective lens unit 220, 420 and the like once again, and reflected at the polarizing beam splitter 264D then entered the polarizing beam splitter 263D, and then reflected and astigmatized by the cylindrical lens 265D, entered the second light detection device 267D, and the output signal is used to obtain the signal for reading the information recorded on the second optical disk DD.

Next, as is the case with the first optical disk DB, changes in light amount due to changes in spot shape and changes in position are detected on the second light detection device 267D, and focus detection and track detection are performed, and the objective lens unit 220, 420 for focusing and tracking is moved by the secondary actuator 73 which is affixed to the holder member 50, 150 or the like which holds the objective lens unit 220, 420.

Next, in the case where the third optical disk DC is played, laser beams having a wavelength of 780 nm for example are emitted from the third semiconductor laser 261C, and the emitted light flux is converted to parallel light flux by the collimator 262C, and passed through a polarizing beam splitter 263C, and then reflected at the polarizing beam splitter 264C, and subsequently condensed on the information recording surface MC which is the third optical disk DC by the objective lens unit 220, 420.

The light flux which is modulated by information bit at the information recording surface MC and then reflected, is passed through the objective lens unit 220 and the like once again, and reflected at the polarizing beam splitter 264C then entered the polarizing beam splitter 263C, and reflected and then astigmatized by the cylindrical lens 265C, entered the third light detection device 267C, and the output signal is used to obtain the signal for reading the information recorded on the third optical disk DC.

Also, as is the case with the first and second optical disks DB and DD, changes in light amount due to changes in spot shape and changes in position are detected on the third light detection device 267C, and focus detection and track detection are performed, and the objective lens unit 220, 420 for focusing and tracking is moved by the secondary actuator 73 which is affixed to the holder member 50, 150 or the like which holds the objective lens unit.

The above is a description of the case in which information from the optical disks DB, DD and DC is played, but also in the case where information is recorded on the optical disks DB, DD and DC, the optical system shown in FIG. 5 operates in a similar manner. However, the intensity of the laser beam emitted from the semiconductor lasers 261B, 261D and 261C is set so as to be greater than a prescribed threshold for recording. In addition, the sequence of tracking, focusing and checking written information at the time of writing can be suitably changed in accordance with the use and specification of the optical pickup device.

FIFTH EMBODIMENT

The following is a description of the objective lens unit of the fifth embodiment. It is to be noted that the objective lens unit of the fifth embodiment is one in which those of the first and second embodiments are modified, and the parts that are not described are those which are the same as those of the first and second embodiments.

Figure 9:
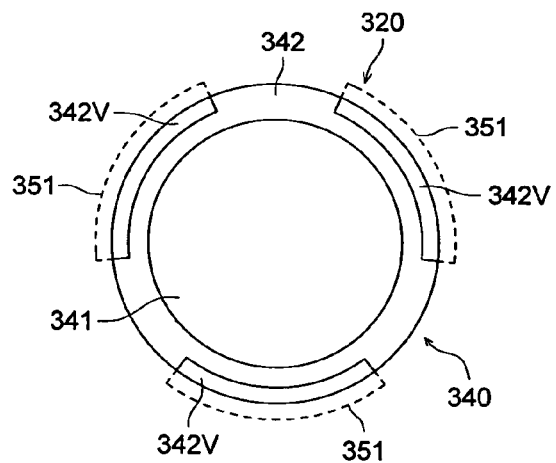
FIG. 9(a) shows the objective lens unit of the fifth embodiment when viewed from the light source side.
FIG. 9(b) shows a lateral cross-section of the movable lens assembly including the objective lens unit.
FIG. 9(c) shows the holder member viewed from the optical disk side.
Figure 9:
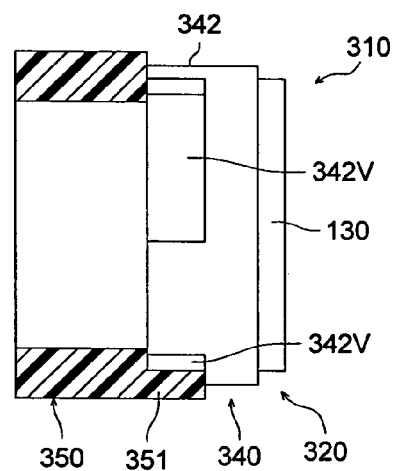
Figure 9:
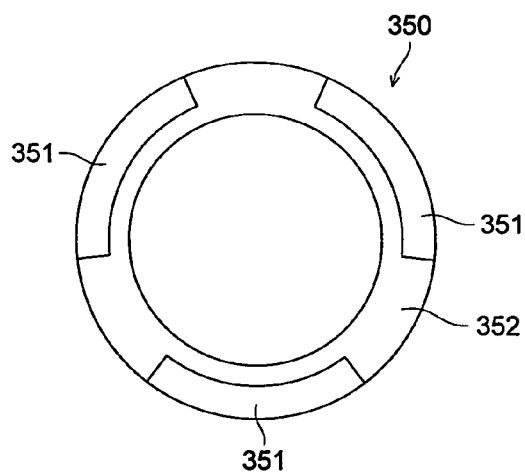

FIG. 9(a) is a view of the objective lens unit of the fifth embodiment viewed from the light source side; FIG. 9(b) is a lateral and partial cross-section of the movable lens assembly that is incorporated in the objective lens unit of FIG. 9(a); and FIG. 9(c) is a view of the holder member from the optical disk side.

The movable lens assembly 310 shown (see FIG. 9(a)) has an objective lens unit 320 (see FIG. 9(b)) and a holder member 350 which supports the objective lens unit 20 at the front end (see FIG. 9(c)). Of these, the objective lens unit 320 is one in which the first optical member 30 and the second optical member 340 are joined to form a single unit. The second optical member 340 has a lens body 41 and a diffraction element body 241 in the middle of the flange portion 342.

The flange portion 342 has three grooves 342v which are formed as notches at three locations on the outer periphery portions of the light source side. Meanwhile, the holder member 350 has three arc-shaped support bodies 351 which extend from the body 352 at three locations at the front end of the optical disk side. When the flange portion 342 is fixed to the front end of the holder member 350, the three support bodies 351 that stand at the font end of the holder member 350 engage with each of the three grooves 342v, which are engaging portions, formed on the side surface of the flange portion 342 and alignment is thereby performed.

In this example, three notch-like grooves are formed in the flange portion 342 and three support bodies 351 are formed in the holder member 350, but the number of grooves 342v or support bodies 351 is not limited to three, and the shape of the groove 342v and the support body 351 is not limited to that shown in the figure as suitable modification can be done.

Furthermore, the shape of the holder member 50 is not limited to a round cylindrical shape, and other cylindrical shapes such as a rectangular cylinder as well as other shapes are possible.

This description was based on the above embodiments, but the invention is not to be limited by these embodiments and various modifications thereof are possible. For example, in the above embodiments, objective lens unit 20, 220 which are specifically for BD or compatible for BC have been described, but this invention may of course be suitably applied to objective lens unit which, for example, are specifically for HD or compatible for HD instead of for BD or BD compatible.

In addition, the number of concave portions 32r formed on the outer periphery of the projection 32c of the flange portion 32 is not limited to three, and may be two, or alternatively four or more. Furthermore, the configuration of the groove 32r is not limited to one in which has a bottom portions in which the distances from the optical axis OA are equal, but rather various configurations are possible. A cuneate or notch shape convex portion is possible, provided that it can hold the bonding agent.

What is claimed is:

1. An objective lens unit for an optical pickup device comprising:
   a first optical element including:
      a first element body positioned on an optical information recording medium side; and
      a first annular portion formed on an outer periphery of the first element body;
   the objective lens unit further comprising a second optical element including:
      a second element body positioned on a light source side of the first element body; and
      a second annular portion formed on an outer periphery of the second element body and coupled to the first annular portion,
   wherein the first annular portion has a portion in which concave portions extending in an axis direction are formed at a plurality of portions on an outer periphery surface of the first annular portion.

2. An objective lens unit for an optical pickup device comprising:
   a first optical element including:
      a first element body positioned on an optical information recording medium side; and
      a first annular portion formed on an outer periphery of the first element body;
   the objective lens unit further comprising a second optical element including:
      a second element body positioned on a light source side of the first element body; and
      a second annular portion formed on an outer periphery of the second element body and coupled to the first annular portion,
   wherein second annular portion has a portion in which a size of an outer shape of at least a part of an outer periphery of the second annular portion is smaller on a light source side than on an optical information recording medium side.

3. The objective lens unit of claim 1,
wherein the concave portions are portions in which a radius is reduced on a substantially cylindrical outer periphery surface of the first annular portion.

4. The objective lens unit of claim 1,
wherein the concave portions are portions in which a thickness of the first annular portion is thin.

5. The objective lens unit of claim 1,
wherein radii of bottoms of the concave portions on an outer periphery surface of the first annular portion are smaller than a radius of a portion on a substantially cylindrical outer periphery surface of the second annular portion corresponding to the concave portions by a predetermined amount.

6. The objective lens unit of claim 1,
wherein the concave portions are formed to be equally spaced on an outer periphery of the first annular portion.

7. The objective lens unit of claim 2,
wherein the first annular portion is a cylinder having a first projection protruding toward a light source side from an outer periphery of the first element body and the second annular portion is a cylinder having a second projection protruding toward an optical information recording medium side from an outer periphery of the second element body.

8. The objective lens unit of claim 2,
wherein an outer diameter of a light source side of the second annular portion is smaller than an outer diameter of an optical information recording medium side of the second annular portion.

9. The objective lens unit of claim 2,
wherein the second annular portion has a step having a step surface facing toward a light source side on an outer periphery.

10. The objective lens unit of claim 7,
wherein an outer diameter of an optical information recording medium side end of the second projection is larger than an outer diameter of a light source side end of the first projection.

11. The objective lens unit of claim 7,
wherein an inner diameter of an optical information recording medium side end of the second projection is larger than an inner diameter of a base which is a light source side end of the second projection.

12. The objective lens unit of claim 7,
wherein the second projection has an end surface supporting an end surface of a light source side of the first projection, on an optical information recording medium side.

13. The objective lens unit of claim 2,
wherein the second annular portion has notches on at least a plurality of portions of an outer periphery of a light source side.

14. The objective lens unit of claim 2,
wherein the first optical element and the second optical element are respectively formed integrally as a single unit using a transparent resin to correspond to an objective wavelength.

15. An optical pickup device comprising:
an objective lens unit of claim 2 for forming a spot on a recording surface of an optical information recording medium;
a holder having a cylindrical shape and a fixing portion for fixing the objective lens unit on an end of the holder by inserting the objective lens unit from a second optical element side,
wherein the optical pickup device read information of an optical information medium and write information on an optical information medium.

16. The optical pickup device of claim 15,
wherein a drive actuator portion can be mounted on an outer periphery of the cylindrical holder, and
wherein the second annular portion of the second optical element has a fitting portion for fitting the second optical element into an inner surface on an end of the holder and a large diameter portion larger than an inner diameter of the holder and smaller than an outer diameter of the holder.

17. The optical pickup device of claim 15,
wherein a drive actuator portion can be mounted on an outer periphery of the cylindrical holder, and
wherein the second optical element has an engaging portion having a step contacting an end of the holder, on an outer periphery of the second annular portion.

18. The objective lens unit of claim 1,
wherein the first annular portion is a cylinder having a first projection protruding toward a light source side from an outer periphery of the first element body and the second annular portion is a cylinder having a second projection protruding toward an optical information recording medium side from an outer periphery of the second element body.

19. The objective lens unit of claim 18,
wherein an inner diameter of a light source side end of the first projection is larger than an inner diameter of a base which is an optical information recording medium side end of the first projection, and
wherein an inner diameter of an optical information recording medium side end of the second projection is larger than an inner diameter of a base which is a light source side end of the second projection.

20. An optical pickup device comprising:
an objective lens unit of claim 1 for forming a spot on a recording surface of an optical information recording medium;
a holder having a cylindrical shape and a fixing portion for fixing the objective lens unit on an end of the holder by inserting the objective lens unit from a second optical element side
wherein the optical pickup device is configured to read information from an optical information medium and writes information to an optical information medium.

* * * * *

UNITED STATES PATENT AND TRADEMARK OFFICE
CERTIFICATE OF CORRECTION

PATENT NO.       : 7,656,773 B2                                             Page 1 of 1
APPLICATION NO.  : 11/353999
DATED            : February 2, 2010
INVENTOR(S)      : Itoh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Twenty-eighth Day of December, 2010

David J. Kappos
*Director of the United States Patent and Trademark Office*